(No Model.)
C. M. BLYDENBURGH.
VEHICLE.
No. 414,485. Patented Nov. 5, 1889.
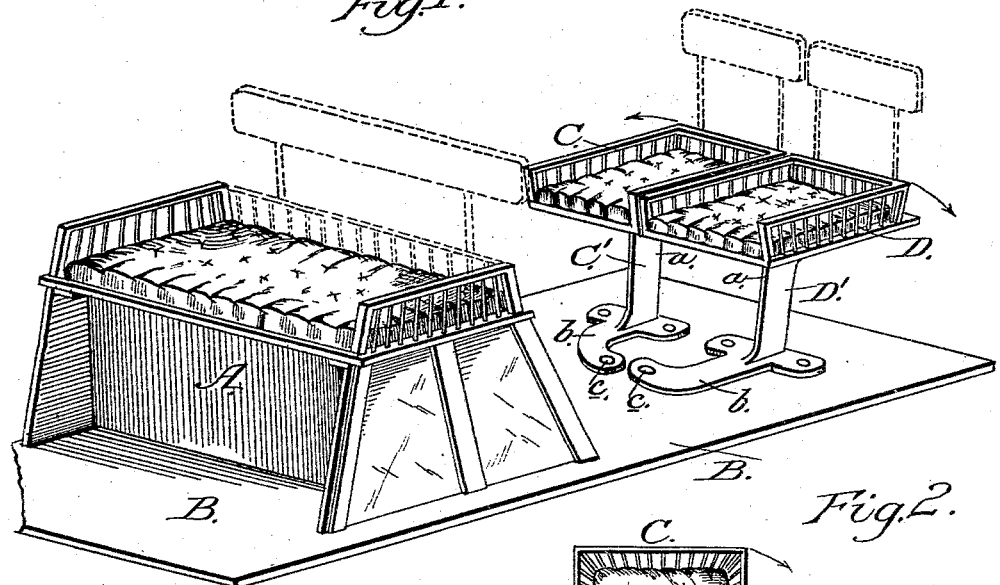
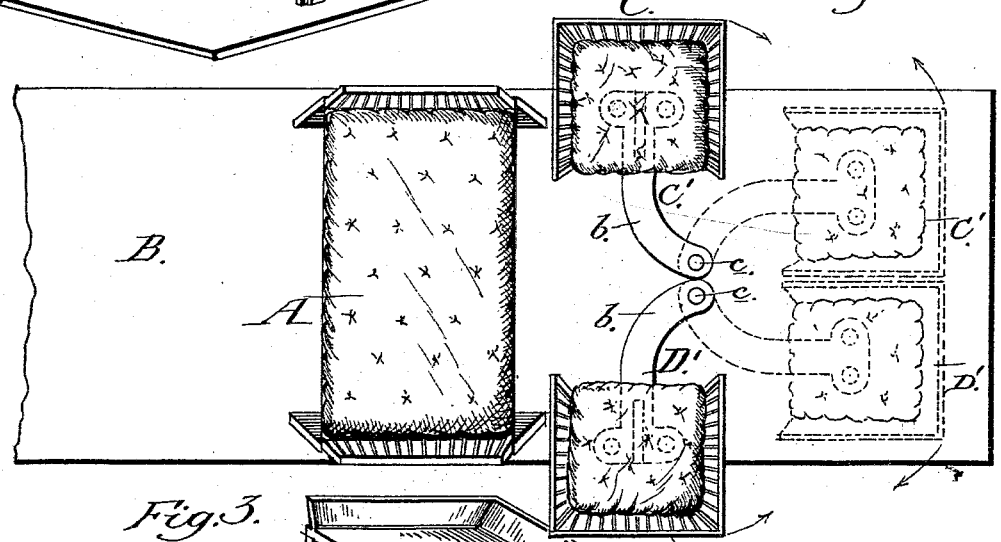
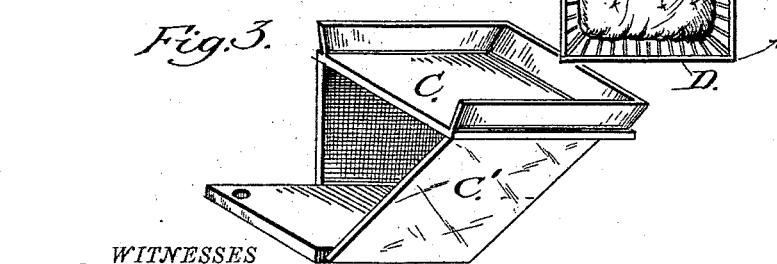
WITNESSES
T. W. Fowler,
W. H. Patterson
INVENTOR
Cha's M. Blydenburgh,
by A. H. Evans & Co.
Attorneys

UNITED STATES PATENT OFFICE.

CHARLES M. BLYDENBURGH, OF RIVERHEAD, NEW YORK.

VEHICLE.

SPECIFICATION forming part of Letters Patent No. 414,485, dated November 5, 1889.

Application filed September 21, 1889. Serial No. 324,633. (No model.)

*To all whom it may concern:*

Be it known that I, CHARLES M. BLYDENBURGH, a citizen of the United States, residing at Riverhead, in the county of Suffolk and State of New York, have invented certain new and useful Improvements in Vehicles, of which the following is a full and clear description, reference being had to the accompanying drawings, forming part of this specification, in which—

Figure 1 represents a perspective view of a vehicle, showing my arrangement of front and rear seats. Fig. 2 is a plan view showing the seats facing inwardly toward each other and at right angles to the position shown in Fig. 1. Fig. 3 is a modification of one of the seats removed.

My invention relates to certain new and useful improvements in vehicles, and especially in that class employing front and rear seats; and my invention consists, essentially, in two independent rear seats placed side by side and having standards pivotally secured to the floor or bottom of the vehicle, whereby one or both of said seats may be turned from one position to a position at right angles thereto.

My invention also consists in the construction and combinations of parts, which I shall hereinafter fully describe and claim.

To enable others skilled in the art to make and use my invention, I will now describe its construction and indicate the manner in which I carry out the same.

Referring to the drawings, A indicates any well-known or desired form of front seat, which may be permanently secured on the floor or bottom B of the vehicle, and may or may not be provided with the usual lazy-back. In rear of the front seat are two independent rear seats C and D, of any appropriate design and construction, and with or without lazy-backs, these seats being supported upon independent standards C' and D'. In Fig. 1 I illustrate these standards as consisting of a metal bar having a vertical portion $a$ secured to the under part of the seat portions, and a portion $b$, which is formed into a horizontal position, so that it may rest upon the upper surface of the floor or bottom, the said horizontal portions $b$ of each standard being also curved inwardly toward each other and being independently pivoted to the bottom or floor B by means of the bolts or pins $c$, as shown in Fig. 1. From this construction it will be seen that when the rear seats are in the position shown in Fig. 1 the occupants thereof are side by side, with their faces toward the front of the vehicle; but when it is desired to alter the positions of these seats it may be readily done by turning them outward in opposite direction, their standards swinging on their pivots and permitting the seats C and D to occupy the opposite sides of the vehicle and to face inward, so that their occupants may sit directly opposite each other and nearer the front seat. By thus arranging the seats conversation between the occupants of all the seats may be readily carried on, and the occupants of the rear seats may enter and leave the vehicle from the rear without danger of soiling the clothes by contact with the wheels.

Instead of using the metal standard before mentioned, I may use any appropriate and suitable box or frame—for instance, as shown in Fig. 3, in which case this box or frame will have a base piece or board, which will be pivotally secured to the bottom or floor B by a bolt or pin $c$, passing through one of its inner corners. This arrangement, as well as the one previously described pivots the seats eccentrically, so that when turned from the position in Fig. 1 to that shown in Fig. 2 they are brought nearer the front seat, thus making it more agreeable for the occupants of the vehicle and permitting conversation to be carried on without their assuming uncomfortable positions.

Having thus described my invention, what I claim as new, and desire to secure by Letters Patent, is—

1. In a vehicle having a front seat, two independent seats in rear thereof and pivoted independently to the floor of the vehicle, whereby they may be turned outwardly at right angles and made to face each other.

2. In a vehicle having a front seat, two seats placed side by side in rear thereof, and having standards pivoted on the bottom or floor of the vehicle, whereby said seats may be turned outwardly in opposite directions and made to face each other, substantially as described.

3. In a vehicle having a front seat, two independent seats side by side in rear thereof, having standards eccentrically pivoted to the bottom or floor of the vehicle, whereby said rear seats may be turned outwardly along the opposite sides of the vehicle and be brought nearer the front seat, substantially as described.

4. In a vehicle having a front seat, two independent seats side by side in rear thereof, and standards for said rear seats, having a horizontal portion resting upon the floor or bottom of the vehicle, said horizontal portions having curved inner ends pivoted to said floor, whereby the seats may be turned from one position to a position at right angles thereto and made to face each other, substantially as described.

CHARLES M. BLYDENBURGH.

Witnesses:
M. V. BLYDENBURGH,
T. WALTER FOWLER.